Oct. 1, 1940.    R. H. BURNS    2,216,510
METHOD OF MAKING CONTACTS
Filed Aug. 16, 1938
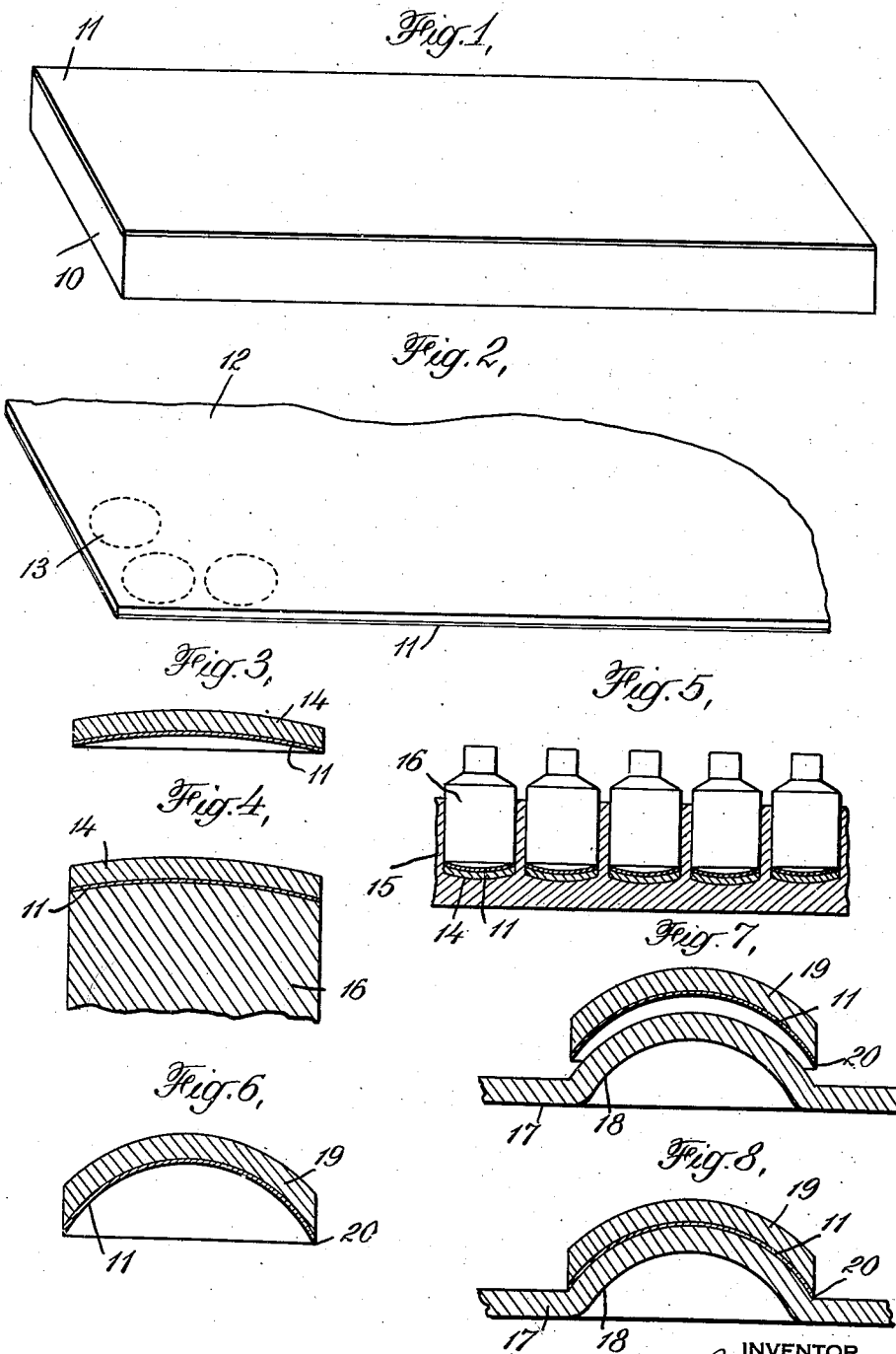

Patented Oct. 1, 1940

2,216,510

UNITED STATES PATENT OFFICE 2,216,510

METHOD OF MAKING CONTACTS

Robert Henry Burns, Bloomfield, N. J., assignor to The H. A. Wilson Company, Newark, N. J., a corporation of New Jersey Application August 16, 1938, Serial No. 225,081

2 Claims. (Cl. 29—155.55)

This invention relates to the manufacture of electrical contacts consisting of a structural or body member and a facing, and is concerned more particularly with a new contact of the composite type referred to, and a novel method by which such contacts may be made rapidly and efficiently.

In the production of composite contacts by the methods heretofore used, the structural member, which may be a rivet, screw, plate, or other formed piece, is made by the usual operations of a suitable metal or alloy, such as copper, steel, brass, etc. The body member is ordinarily formed so that it may be readily attached to a terminal piece or other part, and it is provided with a surface which is to be covered by a facing. This facing, which is the contact point, is made of a material selected because of its electrical and other characteristics under conditions of operation, and it may be made of various metals and alloys, as, for example, fine silver. The facing frequently takes the form of a disc punched from a sheet of the metal and it is customarily secured to the structural member by either soldering or fusion operations. Both of these methods of uniting the parts are subject to numerous objections.

When soldering is employed to secure the facing to the body member, the facing is usually placed on a suitable support, a disc of solder laid on top of it, and the body member placed upon the solder, after which the parts are heated until the solder melts and wets the adjacent surfaces. In the final contact, only a thin film of solder is desired between the facing and body member and this film should be of uniform thickness. It is difficult, however, to produce and handle a solder disc of the thickness of the desired final film and practically impossible to produce so thin a disc with the curved cross section that should be used when the contacting surfaces of the facing and body member are curved. Accordingly, the solder disc employed contains the same mass as the final film but is of considerably greater thickness than the final film and of less diameter than the surfaces to be united.

When this small solder disc is placed on top of the facing, it should be exactly centered with reference thereto, but this is a difficult operation and it frequently happens that the disc lies in an offset position. When the parts are in this position and the solder is melted, the facing and body member are likely to be secured together somewhat offset from one another or with the faces in non-parallel relation. Also when the facing is domed, the molten film of solder may not be uniformly distributed between the facing and body member because of their offset relation. As a consequence, contacts made by this method are frequently defective or require finishing operations, such as machining and stamping.

Another disadvantage of the soldering method for securing the facing to the body member is that a relatively high temperature must be employed, because the solder must be entirely melted, and a flux is usually required to effect a proper union. The high temperature and the use of the flux add to the cost of manufacture, and the melting of the solder frequently causes it to overflow the edges of the facing so that the latter becomes contaminated and the excess solder must be removed.

According to the fusion method, the facing, either in the form of a disc, usually of smaller diameter than the surface of the body member to which it is to be applied, or in the form of fine pieces, or powder, is placed in a cavity in a mold, and the body member seated thereon. The parts are then heated to a temperature at which the facing becomes molten and adheres to the bottom surface of the body member. Because of its application in molten condition and the tendency of the molten metal to ball together, a facing applied in this way is thicker in the middle than at the edges, which may be considered objectionable. Also, if the body member is not precisely centered in the mold, the thick part of the molten material may be eccentric with relation to the body member and because the facing is fused, it may contain blow-holes.

The present invention is directed to the provision of a method of producing electrical contacts which has none of the objectionable features of the prior methods above described, and by the practice of the new method, contacts which are complete and ready for use after the union of the facing and body member may be made without finishing operations. The new contact made by this method is superior to prior contacts in that it includes a facing which is of uniform thickness throughout, and the facing is secured to the body member by a thin film of solder which is also of uniform thickness. For many purposes, it is desirable that the facing should be outwardly convex, and the new contact may be made in this form without difficulty.

In the practice of the method of the invention, the facing is made from a composite sheet consisting of a layer of facing material, to one surface of which has been applied a thin layer of solder. This composite sheet may be made in various ways as, for example, by flowing the solder on one surface of a plate of the facing material, or by securing the solder layer thereto by a soldering operation. The composite block thus produced is then reduced to a sheet of the desired final thickness by rolling operations, and the facings are formed from this sheet by stamping or punching operations. Such a composite facing is then placed in a support with the solder layer uppermost, this support being a plate or board of suitable material having bores or openings of the proper size to receive the facings and the body members resting thereon in contact with the solder. When such a support has been loaded, it is introduced into a furnace in which there is a non-oxidizing atmosphere, and the temperature is raised until the solder softens and adheres to the adjacent surfaces of the body members. After the heating operation is completed, the contacts removed from the board are in final form and require no further operations.

For a better understanding of the invention, reference may be had to the accompanying drawing, in which Fig. 1 is a view in perspective of a composite block consisting of facing material and solder;

Figure 2 is a similar view of the composite sheet made from the block, and illustrates the formation of the facing discs therefrom.

Figure 3 is a sectional view of a facing disc made from the sheet;

Figure 4 is a fragmentary sectional view through a completed contact made by the use of the disc shown in Figure 3.

Figure 5 is a sectional view through the support employed in making the contacts shown in Figure 4;

Figure 6 is a sectional view through a facing disc of a different type;

Figure 7 is a sectional view illustrating the assembling of a disc as shown in Fig. 6 with a structural member of plate form; and Figure 8 is a view similar to Figure 7 showing the completed contact.

The first step in the method of the invention is the preparation of the block shown in Figure 1. This block consists of a plate 10 of the desired facing material, which may be fine silver, a silver alloy, or any other suitable metal. The plate is of substantial dimensions, as, for example, it may be 1" thick, 3" wide, and 12" to 18" long. Attached to one face of the plate is a layer 11 of a suitable solder, such as a silver solder, and this layer may be applied in various ways. Thus, the layer of solder may be affixed to the plate 10 by being flowed thereon, or it may be secured in place by an intervening layer of solder of lower melting point than that of which the layer 11 is made. The layer 11 is considerably thicker than the film of solder which is to connect the facing to the body member in the final contact, and the relative thicknesses of plate 10 and layer 11 are such that after the composition block has been made, it may be rolled down until the layer of facing material has the thickness desired for the contact facings, and the solder layer 11 has the thickness desired for the solder film.

Upon conversion of the composite block 10, 11 into the composite sheet 12 by rolling operations, facings are stamped or punched therefrom, as indicated at 13. These facings are ordinarily of circular disc form, but they may have other shapes depending upon the shape of the body members to which they are to be attached. The term "disc" as used herein is accordingly to be understood as including facings of various shapes. The facing discs produced from the sheet 12 may be flat or of curved section, a disc 14 of curved section being shown in Figure 3.

After the formation of the discs, various methods may be employed for maintaining them in desired relation to their body members during the heating operation. Thus, the discs may be placed with their solder sides uppermost at the bottom of openings in a board 15, these openings being of the proper size to hold the discs in fixed position. The body members 16, here shown as copper rivets, are then inserted in the openings so that their lower ends rest on the solder layers on the discs. In the arrangement shown in Figure 5, the contacts have domed contact points and, accordingly, the discs 14 are punched from the sheet 12 by a punch which will give them the proper curved section, and the lower ends of the rivets have convexly curved surfaces corresponding in curvature to the concave or solder sides of the discs. When such a board has been fully loaded, it is introduced into a furnace where the temperature is such as to cause the solder layers to soften and adhere to the body members resting thereon. This temperature will depend on the melting point of the solder used and may vary, for example, from 1175° to 1850° F. The furnace used preferably contains a non-oxidizing atmosphere as, for example, one of hydrogen, and in the heating operation, it is not necessary that the solder become molten, but only that it soften and adhere to one surface, namely, that of the body member. Upon completion of the heating operation, the board with the contacts in place is removed from the furnace, and the contacts are then ready for shipment and require no finishing operations.

It will be seen that by forming the contact facing discs from the composite sheet, the uniting of the disc to the body members is greatly simplified, and the likelihood of producing imperfect contacts is almost wholly eliminated. Since there is no loose small diameter solder disc interposed between the facing and body member, there is little possibility of the parts becoming offset during the heat treatment. Also, since there is a layer of solder of uniform thickness between the facing and body member at the start of the heating, and the solder need only be softened and not melted, the final connecting film of solder is evenly distributed and of substantially uniform thickness. Moreover, since the solder has been initially secured to the facing, the uniting of the facing and body member in the manner described is relatively easy, and it is found that good contacts may be made without use of a flux and at a lower temperature than has heretofore been required.

In some contacts, it may be desired to apply one or more facings to a body member in the form of a plate, and this can be readily done by the practice of the new method. Such a plate 17 to which a facing is to be secured is first provided with a projection 18 in any suitable way, as by a stamping operation. A composite facing disc 19 is then punched from a sheet 12 and it is given a cross section of a curvature similar to that of the convex surface of the projection in that operation. The disc is then placed upon the projection with its lower peripheral edge 20 resting on the flat surface of the plate at the peripheral edge of the projection. Thereafter, when the parts are heated, the solder softens and unites the facing and projection with a layer of uniform thickness.

In all forms of the new contact, the facing is of excellent physical characteristics because of its having been made from a rolled sheet by punching, and the new method makes it possible to produce perfect contacts rapidly and at low cost.

I claim:

1. A method of making electrical contacts which comprises applying a layer of solder to one face of a sheet of contact facing material to form a composite sheet, rolling the composite sheet to reduce the solder thereon to a substantially uniform thin layer, punching a disc from the final composite sheet, placing the disc with its solder layer against one surface of a contact body member, and subjecting the disc and member to heat to cause the solder layer to soften and adhere to said surface.

2. A method of making electrical contacts which comprises applying a layer of solder to one face of a sheet of contact facing material to form a composite sheet, rolling the composite sheet to reduce it to the desired thickness, punching a disc from the final composite sheet, the disc being of curved cross-section with the solder layer on the concave side, placing the disc on the convexly curved surface of a contact body member with the solder layer of the disc against said surface, and heating the disc and member to cause the solder to soften and adhere to said surface.

ROBERT HENRY BURNS.